United States Patent
Unosen

[11] Patent Number: 5,865,229
[45] Date of Patent: Feb. 2, 1999

[54] TREE HARVESTER

[76] Inventor: Olov Unosen, Ö. Bondsjögatan 3, S-871 52 Härnösand, Sweden

[21] Appl. No.: 875,775
[22] PCT Filed: Feb. 24, 1995
[86] PCT No.: PCT/SE95/00197
  § 371 Date: Aug. 5, 1997
  § 102(e) Date: Aug. 5, 1997
[87] PCT Pub. No.: WO96/25845
  PCT Pub. Date: Aug. 29, 1996
[51] Int. Cl.[6] .................................................. A01G 23/08
[52] U.S. Cl. .................. 144/4.1; 144/24.13; 144/336; 144/330; 144/343
[58] Field of Search ................... 144/4.1, 24.13, 144/34.1, 343, 338, 336

[56] References Cited

U.S. PATENT DOCUMENTS 3,443,611   5/1969  Jorgensen .................. 144/2.1
4,823,849   4/1989  Unosen ....................... 144/24.13

*Primary Examiner*—W. Donald Bray
*Attorney, Agent, or Firm*—Young & Thompson

[57] ABSTRACT

A tree harvester for felling, limbing and cross-cutting tree trunks, comprising a limbing head (15) and felling head (16) assembly which is carried by a boom system. The limbing head (15) and the felling head (16) are detachably connectable to one another and are commonly pivotal about a point (21) on the boom system in conjunction with a tree felling operation. The limbing head (15) and the felling head (16) can be moved away from one another along the boom system (10, 18) in conjunction with a tree-trunk limbing and cross-cutting operation, and also in different directions away from the location on the boom system at which they are commonly pivotal.

10 Claims, 2 Drawing Sheets

TREE HARVESTER

FIELD OF THE INVENTION

The present invention relates to a tree harvester, forest processor, for felling, limbing and cross-cutting tree trunks, comprising an assembly which includes a tree-limbing head and a tree-felling head and which is carried by a boom system, wherein the limbing head and the felling head can be detachably connected together and are commonly foldable about a point on the boom system in a tree-felling mode.

BACKGROUND OF THE INVENTION

A tree harvester of this kind is known, for instance, from Swedish Patent Specification 8600948-7 publication number 463 067). The limbing head and the felling head of this earlier known tree harvester can be connected detachably to one another and the assembly is mounted as a unit for pivotal movement about a pivot point at one end of an arm system to a tree-felling position in which the limbing head and the felling head are able to commonly grip the tree to be felled. The arm system includes at least one fixed first boom and a second boom which can be moved longitudinally in relation to the fixed boom, e.g. telescoped, wherein the limbing head is attached to the further boom and the felling head is attached to the fixed, first boom. The limbing head and the felling head are mutually separated when the second boom is extended out from the first boom, and the tree is limbed by moving the limbing head away from the felling head with the trunk of the tree held firmly by the gripping claws of the felling head. The axially movable second boom is moved in the longitudinal direction of the first boom with the aid of pivot arms.

One drawback with the aforesaid known arrangement is that very long booms and pivot arms are required in order to obtain an acceptable length of movement between the limbing head and the felling head in conjunction with a tree limbing and cross-cutting operation.

SUMMARY OF THE INVENTION

Accordingly, an object of the present invention is to provide a tree harvester which affords more effective movement between the limbing head and the felling head.

This object is achieved with an inventive tree harvester that has the features set forth in the following claims.

BRIEF DESCRIPTION OF THE DRAWINGS

The invention will be now be described in more detail with reference to a non-limiting embodiment thereof and also with reference to the accompanying drawings, in which.

DETAILED DESCRIPTION OF THE INVENTION

Figure 1:
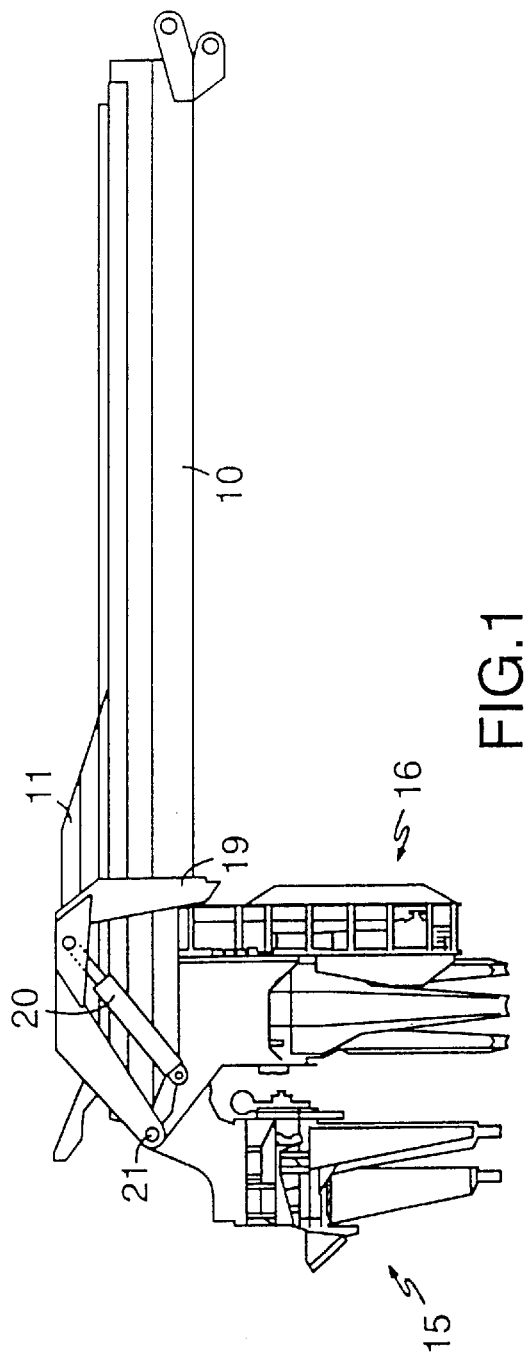
FIG. 1 is a schematic side view of the boom system of an inventive tree harvester and shows a boom-carried tree-felling assembly in an upwardly drawn position.
Figure 3:
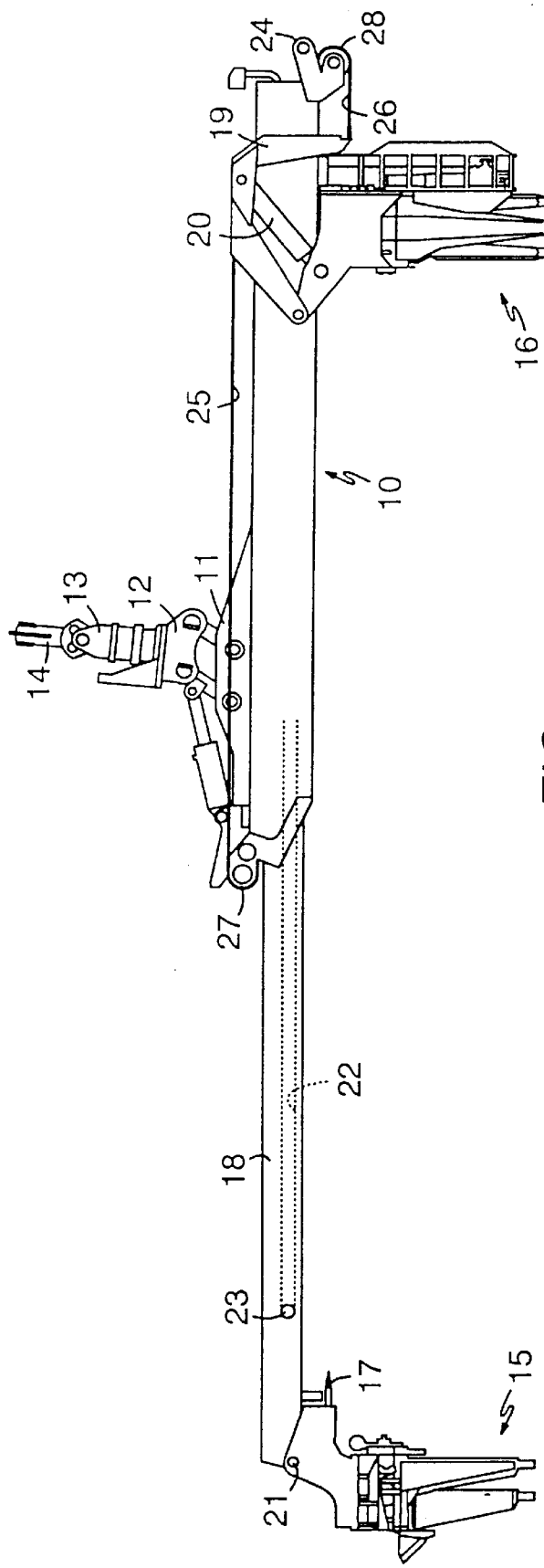
FIG. 3 illustrates the boom system of the inventive tree harvester with the boom system extended, and also shows other components and details with the boom system suspended from a schematically indicated crane arm.

FIG. 1 is thus a side view of an inventive boom system and shows the fixed boom 10 on which there is mounted an attachment 11 to which a so-called tower structure 12 having a rotator 13 is attached, said rotator being supported by a crane arm 14 attached to a forest tractor not shown. The tower structure, rotator and crane arm are shown in FIG. 3, but not in FIG. 1. One end of the fixed boom 10 carries the felling assembly, which is comprised of a limbing head 15 and a felling head 16. Although FIG. 1 shows the limbing head 15 connected with the felling head 16, it will be understood that these two parts of the assembly can be separated from one another as shown in FIG. 3. The fixed boom 10 has the form of a box-profile of essentially rectangular cross-section.

The limbing head 15 typically includes a pair of trunk gripping claws which can be positioned slightly away from the trunk when moving the limbing head axially along the tree, so that the tree can be limbed by moving the limbing head along the trunk. The limbing head has a locking pin 17 intended for insertion into a corresponding opening in the felling head, so as to enable the two heads to be connected together to form a unit.

The felling head 16 is also of conventional design and in addition to trunk-gripping claws also includes a saw, for instance a chain saw, with which the trunk of a tree can be cross-cut, both when felling the tree and when cutting the trunk into given lengths.

The limbing head 15 is not actually carried on the fixed boom 10, but on an outwardly extendable boom 18 of slightly narrower dimensions than the fixed boom 10, as shown in FIG. 3, this slightly narrower boom 18 being housed within the fixed boom and capable of being fully retracted therein, as shown in FIG. 1. The extendable boom also has a generally box-like, rectangular cross-sectional profile. The felling head 16 is carried on the fixed boom 10 by means of a traveller 19, which will be described below with reference to FIG. 3. In the position shown in FIG. 1, the felling head 16 is securely held with the aid of a tilt cylinder 20, for instance a hydraulic piston-cylinder device which is mounted between the felling head 16 and the traveller 19 and to which hydraulic pressure can be supplied either to hold the piston in the position shown in FIG. 1 or to extend the piston to the position shown in FIG. 2. The traveller 19 has a generally U-shape and is carried on the fixed boom 10 by means of slide blocks (not shown), which enable the traveller to be moved in the longitudinal direction of the fixed boom.

Figure 2:
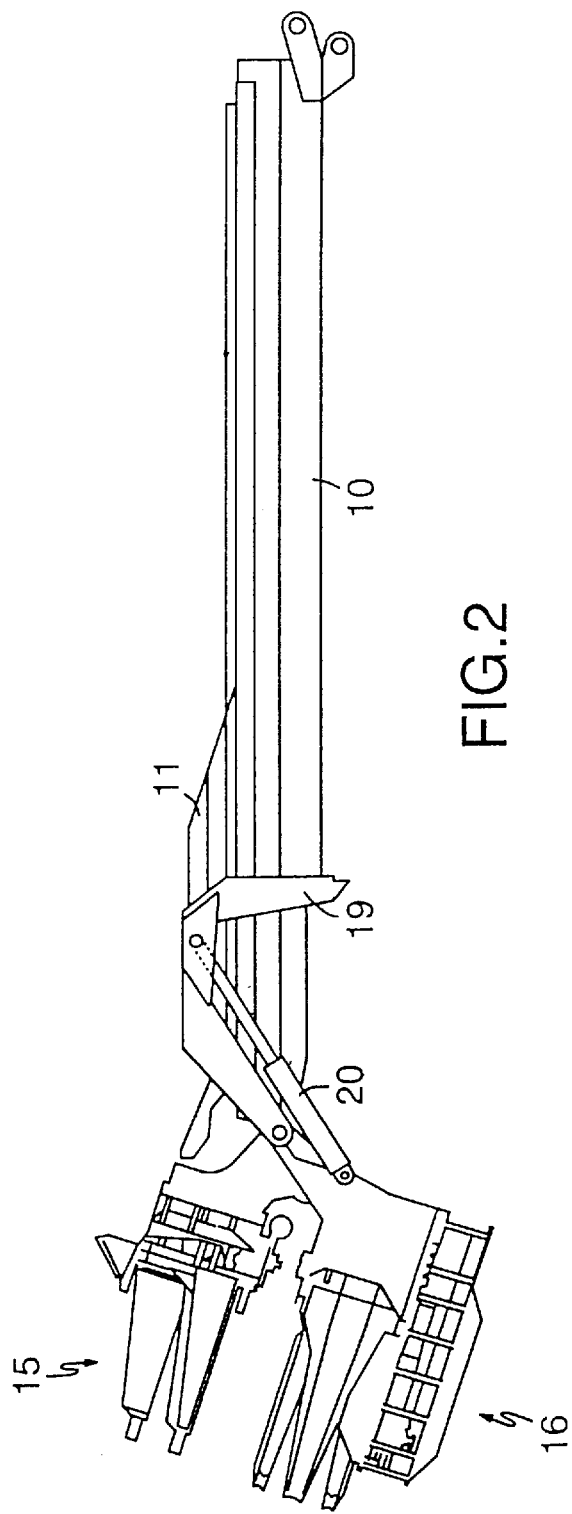
FIG. 2 is a view similar to the view of FIG. 1 but shows the felling assembly extended to a tree-felling position.

As beforementioned, FIG. 2 shows the felling assembly extended to a tree-felling position, i.e. the position taken by the assembly in relation to the boom system when a tree is to be felled. As shown in figure, the piston of the tilt cylinder 20 is extended at this stage, and the whole of the felling assembly is therewith swung about a pivot point 21 by means of which the limbing head 15 is supported at the outermost end of the extendable boom 18. Thus, the limbing head 15 and the entire felling assembly are pivotal about the pivot pin 21 and can be swung from the position shown in FIG. 1 to the position shown in FIG. 2.

The limbing head 15 is preferably provided with locking means (not shown) which lock the limbing head 15 in its upwardly lifted position (FIGS. 1 and 3) at the extendable boom when the limbing head is not connected to the felling head. This locking means may have the form described in the aforesaid Swedish Patent Specification SE 8600948-7.

As mentioned above, FIG. 3 shows the boom system in the position in which the extendable boom 18 is fully extended from the fixed boom 10, and in which the limbing head 15 and the felling head 16 are spaced at a maximum from one another. As indicated at 22, the extendable boom 18 is projected from the fixed boom 10 with the aid of a boom-projecting piston-cylinder device 22 which is housed in the fixed boom 10 and which is attached at one end to a pin 23 in the extendable boom and at the other end to a pin 24 in the rear end of the fixed boom 10. The boom-extending piston-cylinder device 22 is conveniently a hydraulic device to which hydraulic fluid is delivered through a delivery conduit not shown. The limbing head 15 is attached to the outer end of the extendable boom 18 by means of the pin 21 and therewith accompanies the extendable boom as it is extended out of the fixed boom 10.

To enable the traveller 19, and therewith also the felling head 16, to be moved along the fixed boom 10, the traveller is connected to the extendable boom 18 by means of chains, an upper chain 25 and a lower chain 26, such that the traveller 19 will move at the same speed and through the same distance as that moved by the extendable boom along the fixed boom 10, but in the opposite direction. To this end, the upper chain 25 is attached to an upper part of the traveller 19 and extends, via an upper guide wheel 27, to an attachment (not shown) mounted on the extendable boom 18. The lower chain 26 is connected to the rear lower part of the traveller and extends over a guide wheel 28 located at the rearmost end of the fixed boom (to the right in FIG. 2) and returns in through the interior of the fixed boom to an attachment on the extendable boom 18. The chains 25 and 26 may conveniently be so-called fleyer-chains.

As a result of this arrangement and the described maneuvering of the extendable boom and the traveller there is obtained a double transmission with regard to separation of the felling head and the limbing head in response to a given length of stroke of the piston-cylinder device 22. This enables the boom length to be utilized effectively.

It will be understood that the aforedescribed and illustrated components, such as the boom-projecting piston-cylinder device and the chains may be modified or replaced with other equivalent means within the scope of the inventive concept. For instance, the chains can be replaced with wires.

I claim:

1. A tree harvester for felling, limbing and cross-cutting tree trunks, comprising a limbing head and felling head assembly carried by a boom system, the limbing head and the felling head being detachably connectable with one another and being commonly pivotal about a point on the boom system to a tree-felling position, wherein the boom system includes a fixed boom and an extendable boom structured and arranged to project out from the fixed boom in a longitudinal direction, the limbing head and the felling head being movable away from one another along the boom system in conjunction with a tree limbing and cross-cutting operation, and in different directions away from the location on the boom system at which they are commonly pivotal, the boom system being carried in attachment on the fixed boom at an end of the fixed boom in which the limbing head and felling head are commonly pivotal.

2. A tree harvester according to claim 1, further comprising a piston-cylinder boom-projector mounted inside the extendable boom and the fixed boom, wherein the first end of said piston-cylinder is attached to the extendable boom and a second end is attached to the fixed boom.

3. A tree harvester according to claim 1, wherein the limbing head is pivotally mounted on a transverse pivot pin at the outer end of the extendable boom.

4. A tree harvester according to claim 2, wherein the felling head is mounted on a traveler which is movable along the fixed boom.

5. A tree harvester according to claim 4, wherein the traveler is connected to the extendable boom by a chain system for movement along the fixed beam in a direction opposite to that in which the extendable boom is moved in relation to the fixed boom when the extendable boom is projected out from or retracted into the fixed boom.

6. A tree harvester according to claim 4, further comprising a tilt cylinder for holding the felling head firmly in position against the fixed boom when moving the felling head and when cross-cutting and limbing a tree, said tilt cylinder being structured and arranged to pivot the felling head and the limbing head to a tree felling position.

7. A tree harvester according to claim 1, wherein the boom system is mounted on a tower structure carried by a tractor-mounted crane arm via a rotator.

8. A tree harvester according to claim 2, wherein the limbing head is pivotally mounted on a transverse pivot pin at the outer end of the extendable boom.

9. A tree harvester according to claim 3, wherein the felling head is mounted on a traveler which is movable along the fixed boom.

10. A tree harvester according to claim 5, further comprising a tilt cylinder for holding the felling head firmly in position against the fixed boom when moving the felling head and when cross-cutting and limbing a tree, said tilt cylinder being structured and arranged to pivot the felling head and the limbing head to a tree felling position.

\* \* \* \* \*